United States Patent [19]

Casey et al.

[11] 3,889,489
[45] June 17, 1975

[54] LUBRICATED SPLINE COUPLING

[75] Inventors: John W. Casey, Mooresville; Sydney E. Easley, Indianapolis; Melvin O. Gough, Brownsburg; William F. Jones, Indianapolis, all of Ind.

[73] Assignee: General Motors Corporation, Detroit, Mich.

[22] Filed: Aug. 23, 1974

[21] Appl. No.: 500,126

[52] U.S. Cl. ............... 64/9 R; 308/107; 308/127; 308/187; 184/6.11; 403/39
[51] Int. Cl. ............................................. F16d 3/06
[58] Field of Search .......... 403/39, 38, 37, 63, 202, 403/359; 184/6, 6.11; 308/107, 122, 187, 126, 127; 64/9 R, 6, 16; 60/39.08

[56] References Cited
UNITED STATES PATENTS

| | | | |
|---|---|---|---|
| 2,386,639 | 10/1945 | Stafferd | 308/187 X |
| 3,038,556 | 6/1962 | Hamm et al. | 403/38 X |
| 3,285,566 | 11/1966 | Schmitz et al. | 184/6.11 X |
| 3,532,443 | 10/1970 | Johnson | 184/6.11 X |
| 3,621,937 | 11/1971 | Edge | 184/6.11 |
| 3,692,146 | 9/1972 | Butler | 184/6.11 X |
| 3,746,128 | 7/1973 | Wunsch | 184/6.11 |
| 3,757,535 | 9/1973 | Stein | 64/9 R |

Primary Examiner—Richard J. Scanlan, Jr.
Assistant Examiner—Wayne L. Shedd
Attorney, Agent, or Firm—J. C. Evans

[57] ABSTRACT

A splined coupling for maintaining concentricity between first and second drive shafts having colinearly arranged longitudinal axes lying in a common plane includes first and second telescoped tubular members with coupling adapters supported in opposite ends thereof to form an internally sealed coupling having a pair of axially spaced spline connections between each of the coupling adapters and the inner tubular member. A lubricant circuit is defined by an inlet groove in one of the adapters aligned with the outlet from a lubricant distributing system and means for maintaining each of the axially spaced spline connections within the coupling immersed in lubricant during rotation of the first and second shafts and wherein a lubricant return path is defined between the inner and outer tubular members of the coupling to return holes formed in the coupling at the same end as the inlet opening thereto.

3 Claims, 5 Drawing Figures

LUBRICATED SPLINE COUPLING

This invention relates to shaft lubrication systems and more particularly to systems for lubricating the splines of a spline coupling to interconnect first and second shaft members.

In certain rotary devices, it is desirable to interconnect first and second shaft components by means of a spline coupling assembly having spline connections between each of the shafts and coupling for maintaining alignment therebetween during rotation of the shafts.

In such arrangements, it is desirable to maintain the spline coupling assembly as a sealed, integrated assembly having means therein to maintain each of the spline connections between the coupling and the shafts well lubricated during both start and run phases of operation.

Furthermore, it is desirable to circulate lubricating oil through the coupling so as to maintain a flow of lubricant across each of the spline connection teeth to flush abrasive particles from between the teeth so as to minimize wear at each of the spline connections in the assembly.

An object of the present invention is to provide an improved sealed, spline coupling for interconnecting first and second shafts wherein the coupling includes an improved lubricant distributing system for receiving lubricating oil for flow across a pair of internally located axially spaced spline connections within the coupling and for return of oil from the coupling to a point adjacent the oil inlet end of the coupling to simplify oil distribution to and from the lubricated spline connections within the coupling.

Still another object of the present invention is to provide an easily assembled readily connected spline coupling for joining a first shaft on one side of a bulkhead and a second shaft on the opposite side of the bulkhead wherein a lubricant supply port and return are located on one side of the bulkhead to direct oil into the coupling and to receive oil therefrom; the coupling including lubricant distribution means for directing oil across a first spline connection located internally at one end thereof and wherein internal means are provided for maintaining an oil level within the coupling to cover a second axially spaced spline connection within the coupling and with means being included to return lubricant from the first and second spline connections in reverse flow relationship through the coupling to an outlet that is located at the same end of the coupling as the oil inlet opening thereto.

Yet another object of the present invention is to provide a compact, splined coupling assembly having coupling adapters at opposite ends of an outer tubular member for sealing the interior of the coupling assembly and an inner tubular member interconnecting each of the coupling adapters and having means formed therein for maintaining a reservoir of oil inboard of each of a pair of axially spaced spline connections at opposite ends of the inner tubular member and wherein an inlet port for lubricant flow into the coupling is directed through one of the adapters to receive oil from an external lubrication source and direct it across one of the spline connections thence across the inner tubular member for passage through a second spline connection with return oil passing through passage means between the inner and outer tubular members to an outlet that is located at the same end of the coupling as the inlet opening for returning lubricant to the low pressure side of the lubricant supply system.

Further objects and advantages of the present invention will be apparent from the following description, reference being had to the accompanying drawings wherein a preferred embodiment of the present invention is clearly shown.

Figure 1:
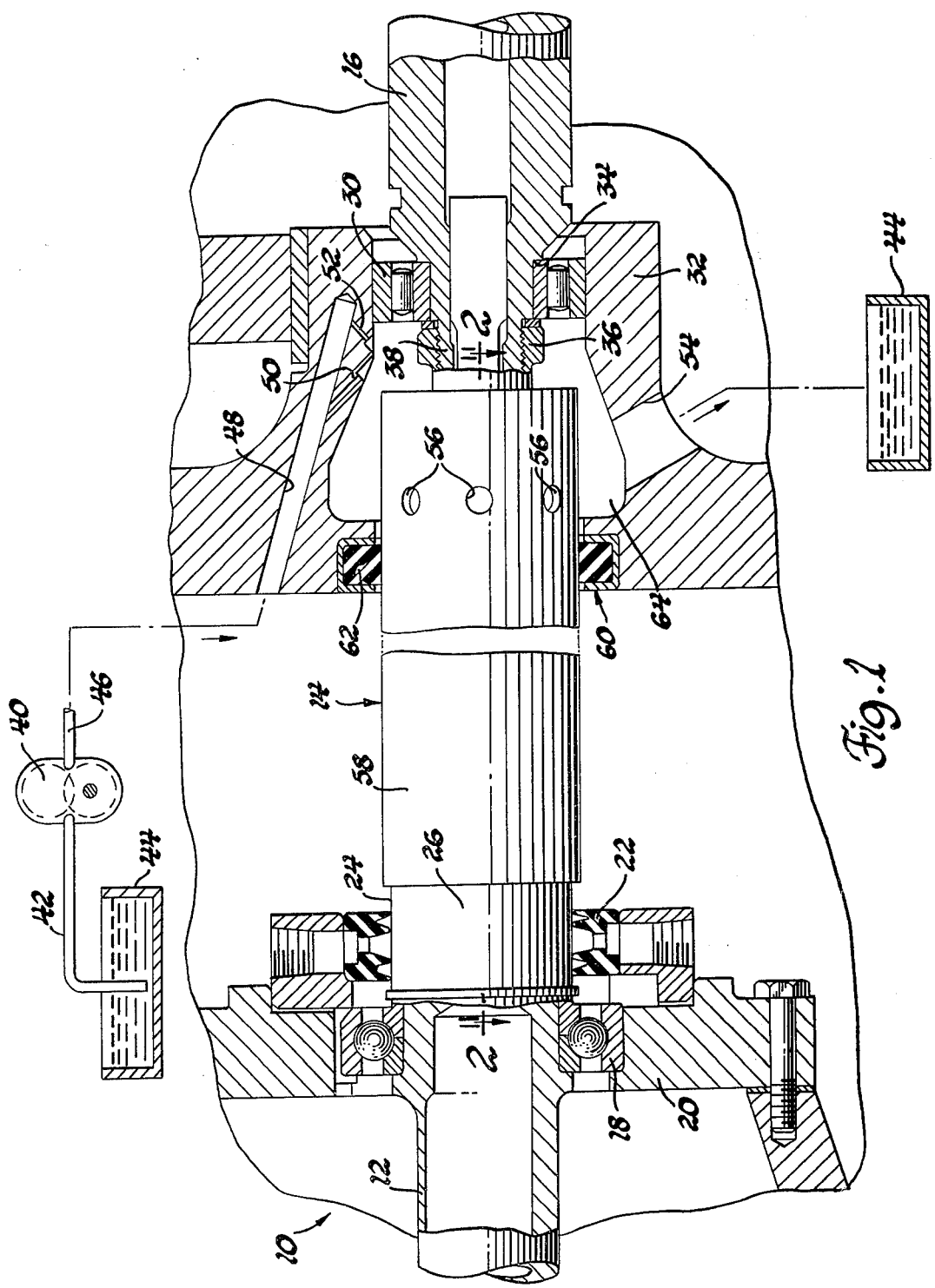
FIG. 1 is a diagrammatic view of a rotary device having two shafts coupled by means of the present invention.

Referring now to the drawings, in FIG. 1 a drive assembly 10 is illustrated including a first shaft 12 having one end thereof connected to a sealed, continuously lubricated spline coupling 14 constructed in accordance with the present invention. The drive 10 further includes a second shaft 16 connected to the opposite end of the spline coupling.

The first and second shafts 12, 16 are representative of two-shaft drive arrangements having longitudinal axes arranged colinearly of one another in a common horizontal plane. In such arrangements, it is desirable to couple the separate shaft components by means of a coupling that will compensate for slight misalignment between the shafts during rotation.

In the illustrated arrangement, the first shaft 12 is rotatably supported by a ball bearing 18 on a support member 20. The support member 20 has a labyrinth seal 22 connected thereto that seals against the outer periphery 24 of an outboard extension 26 on one end of a drive coupling adapter 28, to be further described.

The shaft 16 is rotatably supported at one end thereof by a roller bearing 30 supported on a housing member 32 of a rotary device such as a gas turbine engine. The roller bearing 30 is held against a shoulder 34 on the shaft 16 by means of a retainer nut 36 threadably received on a threaded extension 38 for interconnection of the shaft 16 with the coupling 14.

Rotary machines of the type utilizing spline couplings for interconnecting first and second shaft components therein include pressurized lubricant systems for distribution of lubricant to driven components of the machine. In FIG. 1, a portion of a lubricant system for such a rotary machine is illustrated as including a lubricant pump 40 having an inlet 42 in communication with a sump 44 and an outlet 46 in communication with an inclined passage 48 in the housing member 32. The inclined passage 48 communicates with a pair of lubricant ports 50, 52 for directing lubricant from the passage 48 against the roller bearing 30 and into one end of the splined coupling 14. Lubricant is returned through an opening 54 in the housing member 32 thence to be returned to the sump 44 of the lubricant system.

The lubricant system per se is a known arrangement for distributing lubricant to bearing surfaces in a rotary machine. However, referring now to FIG. 2, the spline coupling 14 incorporates improved means for receiving lubricant from the inclined lubricant port 52 for distribution through the coupling to lubricate spline connections therein and wherein the lubricant is returned from the coupling through a plurality of circumferentially spaced ports 56 formed in an outer tubular member 58 of the assembly 14. The ports 56 are located inboard of an annular seal assembly 60 having an annular seal 62 thereof located in sealing engagement with the outer periphery of the tubular member 58 intermediate the ends thereof so as to seal a lubricant cavity 64 in the housing member 32 to prevent oil leakage from within the housing member 32 exteriorly along the outer surface of the outer tubular member 58.

To accomplish distribution and return of lubricant, the spline coupling 14 comprises two brazed tubular members including the outer tubular member 58 and an inner tubular member 66. The outer tubular member 58 has opposite open ends 68, 70 therein which receive coupling adapter member 28 and adapter member 72 respectively to seal the interior 74 of the tubular member 58, 66 for maintaining a lubricant supply therein during rotation of the coupling 14. The inner tubular member 66 more particularly includes radially outwardly directed flanges 76, 78 on opposite ends thereof that are brazed to the inside diameter 80 of the outer tubular member 58 adjacent the open ends 68, 70 thereof. A plurality of radially outwardly directed ribs 82, 83 are formed on the outer surface of the inner tubular member 66 adjacent each of the flanged ends 76, 78 thereof respectively and are brazed to the inside diameter 80 of the outer member 58 to define a plurality of lubricant grooves 84, 85 respectively spaced circumferentially around the outer circumference of the inner tubular member 66 for flow of lubricant through an annular space 86 between the tubular members 58, 66 to the lubricant ports 56 which are formed in the outer tubular member 58 adjacent the brazed connection between the flange 78 and the outer tubular member 58.

The inner tubular member 66 further includes a first spline set 88 at one end thereof which are in communication with an internal groove 90 formed in the inner wall of the inner tubular member 66 immediately adjacent the set of spline 88. Each tooth of the spline set 88 includes an inclined hole 92 therein to direct lubricant from the spline set 88 into the annular passage 86. The opposite end of the tubular member 66 includes a second set of splines 94 which are in communication at one end thereof with the open end 70 of the outer tubular member 58 and at the opposite end thereof are in communication with a lubricant groove 96 in the inner wall of member 66. The grooves 90, 96 are communicated through a bore 98 defined by a reduced inside diameter portion of the inner tubular member 66. The inside surface of the bore 98 distributes oil from the grooves 90, 96 so as to cover the full height of each tooth in the spline sets 88, 94 so as to immerse each of the spline sets 88, 94 with lubrication during operation of the device.

Figure 2:
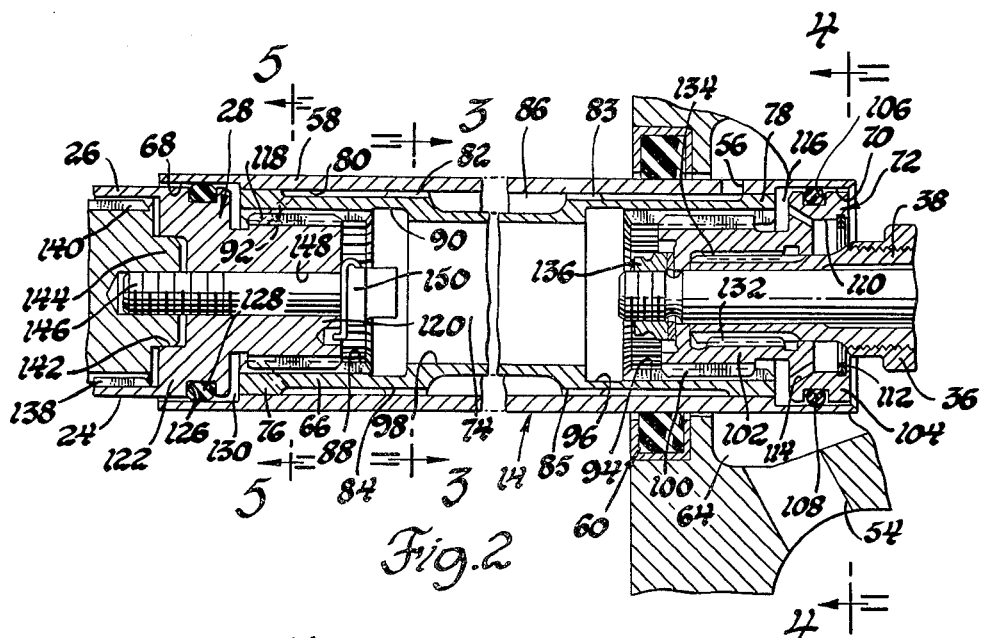
FIG. 2 is a horizontal sectional view taken along the line 2—2 of FIG. 1 showing the lubricated spline drive coupling of the present invention.
Figure 3:
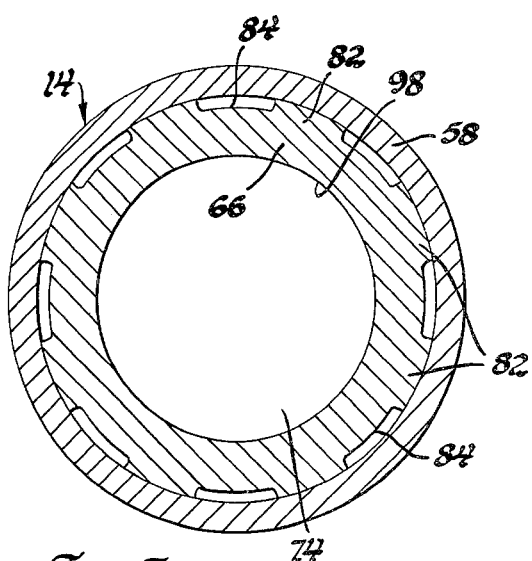
FIG. 3 is a cross-sectional view taken along the line 3—3 of FIG. 2 looking in the direction of the arrows.
Figure 4:
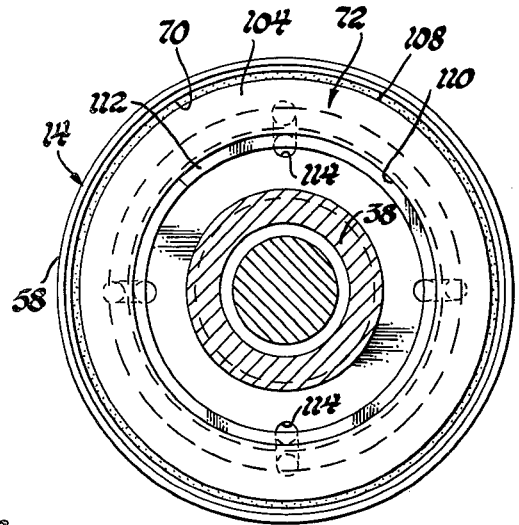
FIG. 4 is a vertical sectional view taken along the line 4—4 of FIG. 2 looking in the direction of the arrows.
Figure 5:
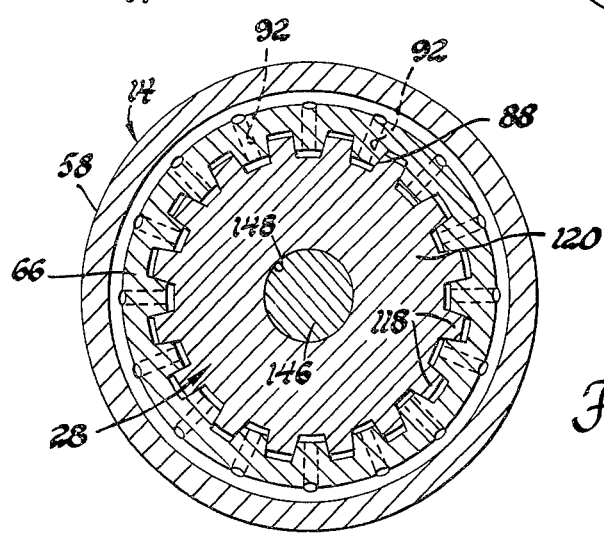
FIG. 5 is a vertical sectional view taken along the line 5—5 of FIG. 2.

The coupling adapter 72 more particularly includes a set of external spline teeth 100 on an inboard extension 102 thereof that is located within the spline set 94 so as to interconnect the coupling adapter 72 with the inner tubular member 66 as best seen in FIG. 2. The coupling adapter 72 further includes a large diameter end portion 104 that includes a circumferential groove 106 therein with an annular seal 108 fit within the groove 106 so as to be positioned in sealing engagement with the inner surface of the open end 70. The large diameter portion 104 includes an internal bore 110 that is opened at the outboard end thereof so as to receive lubricant that is directed from the lubricant supply system through the port 52. The bore 110 is partially closed at the inlet end thereof by a radially inwardly directed dam defined by a snap ring 112 to prevent lubricant directed into the open ended bore 110 from being centrifugally dispersed therefrom during rotation of the spline coupling 14. The oil directed into the bore 110 is centrifugally directed through a plurality of circumferentially spaced holes 114 into a pressurized lubricant inlet chamber 116 that is immediately upstream of the connected external spline teeth 100 of the extension 102 and the spline teeth of the set 94 formed on one end of the inner tubular member 66. The outwardly centrifuged oil will build up a pressure differential so as to force lubricant through the spline teeth 94, 100 and the lubricant will serve to maintain the wear surfaces of the spline connection fully lubricated to prevent excessive wear therebetween. Any particles retained on the spline teeth are flushed by the lubricant flow thereacross into the oil groove 96. Lubricant circulation, during the shaft rotation phase of operation, is maintained as a thin layer of oil on the inner surface of the bore 98 to assure that the full height of each of the spline teeth will be covered with lubricant during shaft rotation. The oil is forced by centrifugal action across the lubricant collecting groove 90, thence through the spline teeth 88 which mesh with a set of external spline teeth 118 on an extension 120 of the coupling adapter 28. The coupling adapter 28 further includes a large diameter portion 122 having an outer circumferential groove 126 therein to receive an O-ring 128 that is sealingly engaged with the inner surface of the open end 68 of the outer tubular member 58. Thus, oil flow across the spline teeth of the set 88 and 118 will collect in an annular space 130 between the end of the large diameter portion 124 and the teeth of the spline sets 88, 118. Lubricant will be pressured from the space 130 across each of the inclined holes 92 in each spline teeth of the set 88 into the annular passage 86. The outwardly centrifuged oil will be returned through the passage 86 in counterflow relationship to the flow across the spline connections and will be distributed radially outwardly of the coupling 14 into the lubricant cavity 64 for return to the lubricant sump 44.

In the illustrated arrangement, the coupling adapter 72 includes a set of internally formed spline teeth 132 which mesh with external spline teeth 134 on the end of the shaft extension 38. The shaft extension is held with respect to the coupling adapter by means of a lock nut 136 of the inboard end of the shaft extension 38. Likewise, the coupling adapter 28, at the tubular extension 26 has a set of internal spline teeth 138 that mesh with external splined teeth 140 on the end of the first shaft 12. A pilot bore 142 formed in the outboard end of the coupling adapter 28 receives a hub portion 144 on the end of the shaft 12. A bolt 146 is threadably received in the hub portion 144 and directed through an internal bore 148 of a coupling adapter 28 for fastening the shaft 12 against axial movement with respect to the spline coupling between the adapter 28 and the set of spline teeth 88. A locking washer 150 secures the threaded stud 146 with respect to the extension 120 of the coupling adapter 28.

The aforesaid interconnection between first and second shafts 12, 16 and the drive coupling adapters 28, 72 is merely representative, it being understood that other forms of connections can be utilized between each of the first and second shaft components and a mating coupling adapter so long as a coupling adapter includes a seal carrying member for closing opposite ends of the coupling 14 against lubricant flow therefrom.

In the illustrated embodiment, the first shaft 12 can be an input power shaft for operating a second shaft such as shaft 16 within a test stand for rotary wheels such as centrifugal impellers. In such a case, the housing member 32 forms part of the test stand and the lubricant system would be associated therewith for maintaining an assured lubricant supply flow through the spline coupling 14 that connects the external power input shaft 12 to the shaft 16. The aforesaid arrangement is characterized by the compactness of the coupling assembly 14 and a configuration therein which enables it to be quickly located between first and second shafts merely by securing each of the coupling adapters 28, 72 on the oppositely aligned ends of the separate shafts 12, 16 and thereafter slip fitting the set of spline teeth or within the inner tubular member 66 on the external spline teeth 100 of the coupling adapter 72 and thereafter inserting the opposite coupling adapter 28 into the opposite open end of the outer tubular member 58 to mesh with splines 88.

While the embodiments of the present invention, as herein disclosed, constitute a preferred form, it is to be understood that other forms might be adopted.

What is claimed is:

1. A spline drive coupling for maintaining alignment between first and second horizontal shafts arranged colinearly of one another comprising: an inner tubular member having a bore therethrough with spline surfaces at opposite ends of said bore, a plurality of grooves formed longitudinally of the outer surface of said inner tubular member, an open ended outer tubular member telescoped over said inner tubular member having spaced portions thereon secured to the outer circumferential surface of the opposite ends of said inner tubular member to close each of said grooves to define a lubricant return path therethrough, a first closure member slidably fit within one end of said outer tubular member and including an externally splined extension thereon interconnected within the spline surface on one end of said inner tubular member to define a first spline connection, a second closure member slidably fit within the opposite end of said outer tubular member and including an externally splined surface thereon interconnected with the spline surface at the opposite end of said inner tubular member to define a second spline connection, means forming an annular lubricant pickup on one end of said first closure member, an oil inlet hole through said first closure member for communicating said pick-up with said first spline connection, said bore having a pair of spaced, parallel circumferential grooves formed therein for defining lubricant pockets from which lubricant is centrifuged during rotation of said coupling, one of said pockets being in communication with said first spline connection and the other of said pockets being in communication with the second of said spline connections, a plurality of inclined holes formed in said opposite end of said inner tubular member to direct lubricant flow through said first and second spline connections into said return path grooves, said outer tubular member including a plurality of circumferentially spaced holes therein in communication with said grooves for defining an outlet therefrom, each of said outlet holes being located at the same end of said outer tubular member as the inlet hole thereto.

2. A lubricated spline coupling for maintaining a centered relationship between first and second horizontal shaft members each rotatably supported by bearing means to maintain a colinear relationship therebetween comprising: a first coupling adapter having an external spline surface and an internal bore with a spline surface adapted to be connected to an externally splined end of a first shaft, an outer peripheral seal carried by said first coupling adapter, an open ended outer tubular member having one end thereof slidably supporting said first seal means to close said one end of said outer tubular member, a second coupling adapter having an external spline surface and open ended bore thereon with a spline surface adapted to form a spline connection with the spline end of a second shaft, said second coupling adapter including an outer peripheral seal thereon, said outer tubular member including the opposite end thereof slidably supporting said second annular seal for sealing said opposite end of said outer tubular member, an inner tubular member telescoped within said outer tubular member inboard of said seals and having a bore therethrough including spaced apart spline surfaces thereon, one of said spline surfaces being engageable with the external spline of said first coupling adapter to define a first internal spline connection, the opposite spline surface on said inner tubular member being coupled to the external spline of said second coupling adapter to define a second internal spline connection, means defining a lubricant flow path through said first and second internally located spline connections including an inlet hole in said first coupling adapter, an oil lubricant chamber located upstream of said first spline connection, first and second annular lubricant pockets in said inner tubular member downstream of said first spline connection, one of said annular pockets receiving lubricant flow from said first internal spline connection and the other of said annular pockets serving as an inlet for flow of lubricant centrifuged into and through said second internal spline connection, and means for returning lubricant from said second spline connection to said opposite end of said outer tubular member including passage means formed between said inner and outer tubular members including an outlet opening located at the same end of said outer tubular member as the inlet hole thereto.

3. A lubricated spline coupling for interconnecting first and second shafts having their longitudinal axis arranged colinearly in a common plane comprising: an inner tubular member having an involuted internal surface at opposite ends thereof defining first and second axially spaced spline teeth, a lubricant collection groove located within said inner tubular member axially inwardly of each of said sets of spline teeth, said inner tubular member having a reduced diameter intermediate segment therein defining an oil transfer surface between each of said oil collection grooves, an open ended outer tubular member telescoped over said inner tubular member, said inner tubular member having a radially outwardly directed flange on each end thereof secured to the inner diameter of said outer tubular member, said inner tubular member further including radially outwardly directed ribs thereon having a plurality of lubricant flow return grooves therebetween, each of said ribs being connected to the inner surface of said outer tubular member thereby to further secure said inner and outer tubular members together against relative rotation therebetween, a drive coupling adapter member supported in each end of said outer tubular member, each of said drive coupling adapters including circumferentially spaced external spline teeth thereon interconnected with one of said sets of spline teeth in said inner tubular member to define first and second spline connections, each of said adapters further including seal means thereon engageable with said outer tubular member for sealing the opposite ends thereof, one of said adapters including a lubricant inlet bore adapted to receive lubricant from a lubricant distributing system, means partially closing said bore including a radially inwardly directed dam on said adapter at the inlet bore thereto, a plurality of circumferentially spaced inlet holes communicating said bore with one end of the first spline connection between said inner tubular member and said first adapter, said adapter and said inner and outer tubular members defining a lubricant inlet chamber for communicating said oil inlet holes with said first spline connection for distribution therethrough, said distributed lubricant being maintained upon rotation of said coupling as a centrifuged lubricant level filling each of said first and second lubricant collecting grooves and covering said first and second spline connections with lubricant, means including a hole directed through each spline tooth in the opposite end of said inner tubular member, each of said holes being in communication with said lubricant return grooves and serving to return the centrifuged lubricant from the second spline connection through the lubricant return grooves, and means forming a plurality of outlets in said outer tubular member located adjacent the inlet holes in said first coupling adapter to return lubricant from said first and second spline connections back to the lubricant inlet end of said coupling.

* * * * *